United States Patent [19]

Lewison

[11] Patent Number: 4,522,267
[45] Date of Patent: Jun. 11, 1985

[54] SHREDDER/PLOW COMBINATION

[75] Inventor: Richard A. Lewison, Pocahontas, Iowa

[73] Assignee: Ronald D. Wetherell, Cleghorn, Iowa

[21] Appl. No.: 448,937

[22] Filed: Dec. 13, 1982

[51] Int. Cl.³ .............................................. A01B 49/04
[52] U.S. Cl. ....................................... 172/28; 172/45; 172/776; 172/78; 111/1
[58] Field of Search ...................... 172/28, 776, 29, 63, 172/71, 45, 166, 142, 125; 111/1; 47/9

[56] References Cited

U.S. PATENT DOCUMENTS

| | | | |
|---|---|---|---|
| 2,936,838 | 5/1960 | Bonomo | 172/28 |
| 3,122,871 | 3/1964 | Frevik | 172/45 X |
| 3,826,315 | 7/1974 | Blair | 172/166 |
| 3,880,099 | 4/1975 | Houston | 111/1 |
| 3,913,502 | 10/1975 | Richey | 111/1 |
| 4,227,581 | 10/1980 | Klotzbach | 172/142 |
| 4,324,295 | 4/1982 | Weichel | 172/28 |
| 4,359,100 | 11/1982 | Weichel | 111/1 |

FOREIGN PATENT DOCUMENTS 2506223 8/1976 Fed. Rep. of Germany ........ 172/28

OTHER PUBLICATIONS

M&W Till 'N' Tote Advertizing Brochure of M&W Gear, Gibson City, Il., 10/81.

*Primary Examiner*—Richard J. Johnson
*Attorney, Agent, or Firm*—Emrich & Dithmar

[57] ABSTRACT

An integrated shredder/plow combination for reducing trash to facilitate its being mixed with the soil by the action of the trailing plow portion of the combination is disclosed. The shredder portion includes a unique arched structure positioned above a housing enclosing the shredder's cutting blades which permits the plow's drag to be transmitted directly to the tractor hitch so as to bypass the shredder assembly. The shredder assembly is thus not subjected to the large longitudinal forces associated with plowing operations as well as the high side loading encountered during turns and as a result of ground countour. This prolongs shredder operating lifetime and increases its reliability. By positioning the plow assembly immediately aft of the shredder mechanism, the cut-up vegetation, or trash, is more effectively turned under as it is in an agitated, suspended condition when it encounters the burying action of the trailing plow assemblies. The shredder/plow combination includes tractor-operated hydraulic cylinders in combination with transport wheels to facilitate transport of the shredder/plow combination to and from the work area. The shredder portion is driven by a power supply shaft from the tractor via a gear box and includes drive belt tension adjustment means for selecting the rotational drive force applied to the shredder's rotor. In addition, the shredder portion may be detached from the plow portion of the combination and easily installed between a tractor hitch and a conventional tool bar assembly.

19 Claims, 2 Drawing Figures

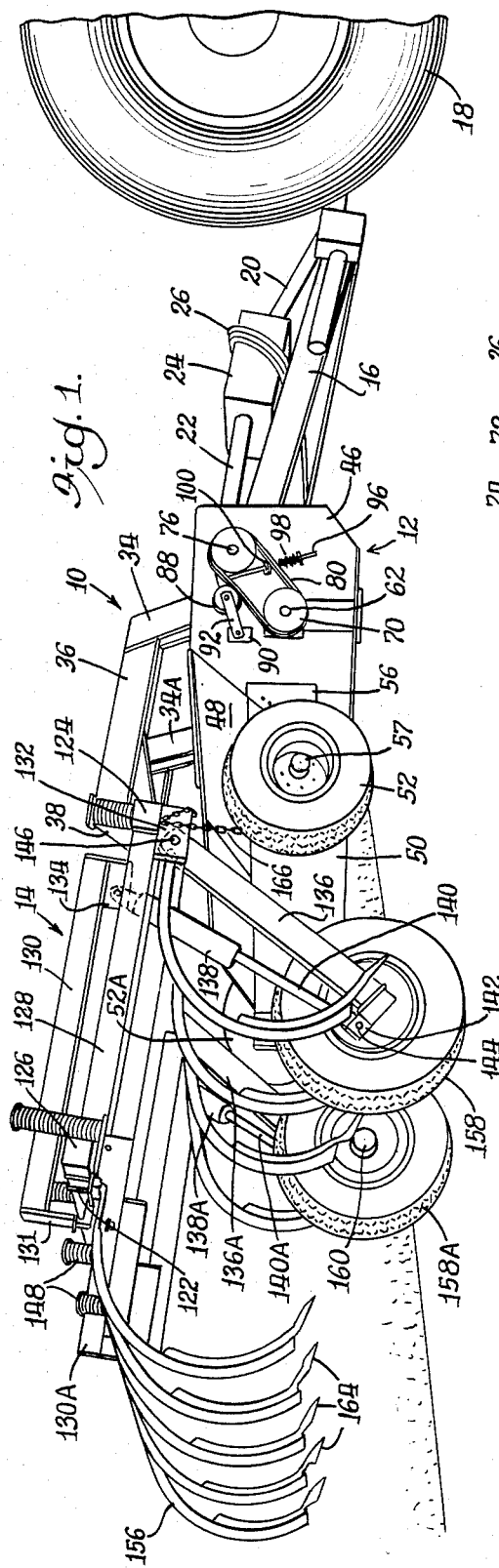
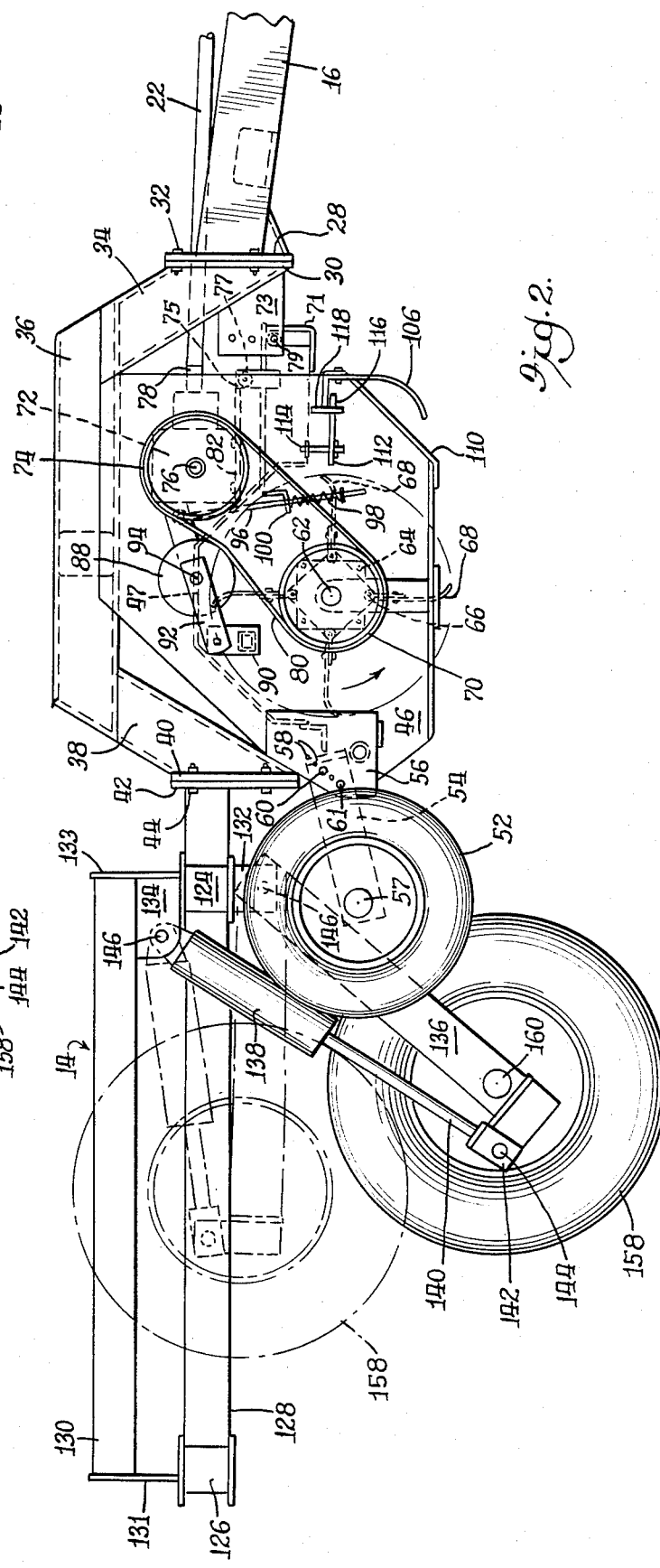

SHREDDER/PLOW COMBINATION

BACKGROUND OF THE INVENTION

This invention relates generally to agricultural apparatus for reducing and mixing crop residue with the soils for expediting the decay thereof while reducing soil erosion and is particularly directed to an integral shredder/plow combination for mixing and burying surface trash.

Minimum tillage and trash farming techniques are increasingly being used by farmers as a means of reducing the amount of time necessary to accomplish field preparation and planting, permitting the farmer to plant more acreage and increasing the efficiency of his operation. Minimum tillage conservation practices also reduce soil erosion caused by wind and water run-off and reduce the number of tractor passes over the tilled land and the costs of fuel associated therewith. Trash farming and minimum tillage practices contemplate leaving vegetational residue on or near the soil surface to check erosion and serve as a mulch for substantially reducing the cultivation process. This involves reducing the trash residue to a size which facilitates its decomposition while maintaining a partial soil cover for the retention of moisture therein and to prevent wind and water run-off. Examples of prior art vegetation cutting implements are described in U.S. Pat. Nos. 2,999,346 and 3,035,393 to Mathews and 4,148,174 to Mathews and Rogers.

This cultivation process makes use of a cutting or shredding device for reducing trash particle size, followed by a plow assembly for mixing the thus reduced trash with the soil for attaining the aforementioned objectives. Initially, this practice required two separate passes over the worked field, the first for reducing the trash and the second for producing the soil-trash mixture. Later attempts sought to reduce the time and expense in such field preparation by installing a shredder device between the plow assembly and the tractor.

This approach generally made use of shredder or chopper implements which incorporated a rotor mounted within an elongated housing propelled by a tractor along an axis perpendicular to the housing. The rotor is provided with blades which sever and reduce vegetation extending from the terrain over which the device moves. The primary shortcoming of this combination is related to the structure of the shredder assembly which is not designed for the high drag forces produced by a plow assembly. The excessive draw bar pull of a plow would typically result in damage to or the destruction of the shredder assembly.

Not only are the high forces associated with the direction of travel of the tractor destructive of the shredder mechanism, but the shredder is also subjected to large side loading due to ground surface contour variations and during turns such as at the edge of the field being worked. While the longitudinal forces tend to damage the shredder's structural frame, the latter side loading forces are generally too much for the shredder's wheel bearings causing their failure. In addition, the high twisting forces encountered during deep plowing operations tends to tear apart and cause the failure of the shredder frame. Finally, coupling these implement assemblies is a somewhat complex task resulting in a cumbersome structure requiring two separate hydraulic take-off systems for the operation of two separate implement transport systems.

Therefore, in view of the above, the present invention is intended to provide an improved shredder/plow combination which requires a single hydraulic take-off system, avoids applying excessive forces to the shredder assembly, and provides improved trash cutting and soil mixing operation.

SUMMARY OF THE INVENTION

The present invention contemplates the combination of a shredder and plow assembly for chopping up trash and reducing the particles thereof to a size easily mixed with the soil by the action of the trailing plow units. The shredder assembly is easily incorporated between a tractor hitch and a conventional toolbar assembly to which cutting colters, chisel plow shanks or any other agricultural tools used in reducing and burying trash may be mounted. The shredder assembly includes an upper, arched structure positioned above a housing which encloses the rotating cutting knives. A forward portion of the arched structure couples directly to a conventional tractor hitch while an aft portion thereof may be securely coupled to a conventional toolbar arrangement. The arched structure thus provides for the by-passing of the shredder assembly in applying the high drag force of the plow assemblies directly to the tractor hitch. The shredder assembly includes a belt-driven arrangement coupled to the tractor's power supply shaft for the rotation of cutting knife assemblies for reducing the trash before it is discharged from the housing immediately forward of the trailing plow assemblies.

Mounted on each end of the shredder housing is a variably positioned gauge wheel for adjusting the running height of the shredder knives. Transport wheels are pivotally coupled to the toolbar assembly by means of hydraulic cylinders which provide for the vertical displacement of the shredder/plow combination in facilitating its transport to and from a work area. The cylinders are coupled to and actuated by the tractor's hydraulic system. The tension of the drive belts used to rotate the cutting knife assemblies may be easily adjusted to accommodate rough terrain or large obstructions in protecting the cutting knife assemblies from damage or destruction. Similarly, the position of a shear bar located within the housing immediately adjacent the rotating knife assemblies and along the length thereof may be selectively adjusted for varying the cutting characteristics of the shredder. The unique structure of the integrated shredder/plow combination provides for enhanced trash mixing action by increasing air flow through the cutting knife assemblies as well as improved trash burying action by subjecting the thus agitated trash to the soil-turning action of the immediately trailing plow assemblies. The unique coupling between the plow assemblies and the tractor hitch via the shredder assembly permits the high drag plow forces and lateral forces encountered during turns and as a result of ground contour to by-pass the shredder assembly thereby prolonging its operating lifetime and increasing its reliability.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 illustrates a rear and side perspective view of a shredder/plow combination in the transport configuration in accordance with the present invention; and FIG. 2 shows a partially cut away side view of the shredder/plow combination of FIG. 1.

DESCRIPTION OF THE PREFERRED EMBODIMENT

Referring to FIG. 1, there is shown a rear and side perspective view of a shredder/plow combination 10 in accordance with the present invention.

The shredder/plow combination 10 is comprised primarily of a tractor hitch portion 16, a shredder assembly 12 and a toolbar assembly 14 to which various agricultural implements may be mounted in a conventional manner. The tractor hitch 16 is shown as a conventional trailer hitch connected by conventional means to an aft portion of the tractor, only a rear wheel 18 of which is shown in FIG. 1. Also coupled to the tractor is a first power supply shaft 20 which is rotationally driven by the tractor and which is coupled to a second power supply shaft 22 by means of a universal coupling joint 24. Universal coupling joint 24 transfers the rotational displacement of the first power supply shaft 20 to the second power supply shaft 22 in providing for the rotation thereof. Also shown in FIG. 1 are hydraulic lines 26 which are coupled to the tractor's hydraulic system (not shown) in a conventional manner for providing hydraulic power to the shredder/plow combination 10 of the present invention. The manner in which the shredder/plow combination 10 makes use of the rotation of the second power supply shaft 22 and the tractor-energized hydraulic power provided via lines 26 is explained in detail in the following paragraphs.

The shredder assembly 12 includes an arched, upper portion or bridge comprised of forward and rear support elements 34, 38 and a center support element 36 which is rigidly coupled to the upper portions of forward and rear support elements 34, 38. The manner in which the shredder assembly 12 is integrated with and coupled to the tractor hitch 16 and toolbar assembly 14 can best be seen in FIG. 2. A rear portion of the tractor hitch 16 is provided with a tractor hitch plate 28, while a forward portion of the forward support element 34 is provided with a forward coupling plate 30. The tractor hitch plate 28 is securely connected to the forward coupling plate 30 by conventional means such as nut/bolt combinations 32. Similarly, an aft portion of the rear support element 38 of the bridge structure includes a rear coupling plate 40 which is securely coupled by means of connecting pins, or nut/bolt combinations, 44 to a coupling plate 42 securely mounted on a forward portion of the toolbar assembly 14. As shown in FIG. 1, the shredder assembly 12 includes two arched bridge structures each comprised of forward and aft support elements and a center support element. The left hand forward support element is shown in FIG. 1 as element 34A. Each bridge structure is securely coupled to an aft portion of the tractor hitch 16 as well as to a forward portion of the toolbar assembly 14 as previously described.

The shredder assembly 12 generally includes a housing defined by a plurality of connected panels and which is generally open on the bottom portion thereof.

The housing includes side panels 46, an upper panel 47, an upper, rear panel 48, a lower, rear panel 50, and a forward panel 108. Mounted to each side panel 46 is a flange 64 having a bearing (not shown) therein and to which is rotationally coupled a rotor shaft 62. Securely mounted on the rotor shaft 62 and extending substantially the length thereof is a blade retaining flange 66 having a generally square cross section. Securely mounted in a hinged manner along the length of the blade retaining flange 66 and at the corners thereof are a plurality of curved blades 68 which serve to cut or shred material passing along the bottom portion of the housing of the shredder assembly 12. The hinged coupling between the curved blades 68 and the blade retaining flange 66 permits the blades to be deflected upon impact with an obstruction preventing blade damage. The combination of blade retaining flange 66 and curved blades 68 rotate in a counterclockwise direction as shown by the arrows in FIG. 2, with rotational drive provided in a manner described in the following paragraph.

A power take-off stub 78 is coupled to a gear box 72 which is securely positioned on a mounting pad 82 in the shredder assembly 12. The gear box 72 includes a cross shaft 76 rotatably coupled thereto which is coupled to and rotates in response to the rotational displacement of the second power supply shaft 22. Coupled to the cross shaft 76 is a sheave 74 which is engaged by a plurality of drive belts 80. Engaging another portion of each of the drive belts 80 is a rotor sheave, or pulley, 70 which is securely coupled to a rotor shaft 62. Thus, rotation of sheave 74 is transmitted via a plurality of flexible drive belts 80 to the rotor sheave 70 resulting in the angular displacement of the rotor shaft 62 and the combination of blade retaining flange 66 and curved blades 68 coupled thereto. It is in this manner that the rotational displacement of the first and second power supply shafts 20, 22 coupled to the tractor (not shown) cause the rotation of blade retaining flange 66 and curved blades 68 mounted thereon for shredding dry vegetation passing beneath the shredder assembly 12. As shown in the figures, the rotor and gear box sheaves 70, 74 are respectively positioned on rotor and cross shafts 62, 76 immediately adjacent side panel 46. In a preferred embodiment, the combination of the aforementioned sheaves and drive belts coupled therebetween are positioned immediately adjacent the outer surface of side panel 46 and are enclosed in a suitable housing (not shown). The combination of these sheaves and drive belts could as easily be incorporated within the housing of the shredder assembly 12 provided these components are enclosed in a suitable housing so as to be isolated from the shredding and cutting process occurring within the shredder assembly 12.

Positioned adjacent the combination of sheaves 70, 74 and drive belts 80 and mounted to the side panel 46 is a mounting bracket 90 which is coupled to one end of a pivot arm 92. To the other end of the pivot arm 92 is connected a tensioning bolt 96 which is mounted to the housing of shredder assembly 12 by means of a mounting bracket 100. Rotation of the bolt 96 results in the generally vertical displacement of the end of the pivot arm 92 coupled thereto. A biasing spring 98 is positioned along bolt 96 to provide a counter force to rotating bolt 96 and allows for securely and more accurately positioning the end of the pivot arm 92 coupled thereto. Rotationally mounted on a center portion of the pivot arm 92 by means of a mounting pin 94 is an idler pulley 88 which is positioned so as to engage drive belts 80. By selectively positioning idler pulley 88 by means of the tensioning bolt 96, the tension of the drive belt 80 upon the rotor and gear box sheaves 70, 74 may be selectively adjusted upward or downward. This adjustment capability accommodates various soil and trash conditions. For example, in rocky soil or where a thick mulch material is encountered, it would be desirable to reduce the tension of drive belt 80 so as to avoid damage to the curved knife blades 68 as a result of impact with a large or rigid obstruction. This precise control over the drive force applied to the cutting knives thus protects the shredder assembly from damage due to impact with field obstructions.

Also positioned within the housing of the shredder assembly 12 is an adjustable shear bar 112. Shear bar 112 is mounted therein by means of a support bracket 114 and a mounting bracket 118 coupled thereto. An adjusting bolt 116 is coupled to mounting bracket 118 and by rotation of the adjusting bolt, the shear bar 112 may be displaced either toward or away from the rotating cutting blades 68. By thus displacing the shear bar 112, the cutting characteristics of the shredder assembly 112 may be selectively adjusted. For example, the dried up vegetation passing beneath the shredder assembly may be reduced to a smaller size by moving the shear bar 112 closer to the rotating cutting blades. Similarly, operation of the shredder assembly over a period of time will result in the wear of the shear bar 112 which may be compensated for by moving the shear bar 112 closer to the rotating cutting knives 68.

Mounted to a lower portion of the forward panel 108 along the length thereof is a curved, flexible flap 106. This flexible flap 106 enhances the agitation of the air/trash mixture as it enters the shredder assembly housing 12 for increasing the cutting and chopping action which occurs therein. Contact between the flexible flap 106 and particulate material over which the shredder assembly passes tends to deflect this material upward into the rotating cutting blades 68 for reducing the size of the thus deflected material. The counterclockwise rotation of the cutting blades 68 within the shredder housing 12 causes a vacuum to be formed in the upper, rear portion thereof which draws the trash upward and over the cutting blade assembly before it is expelled downward and to the rear of the shredder assembly 12. On each end of a lower, forward portion of the shredder assembly housing 12 is mounted a ground contact shoe 110. The ground contact shoe 110 contact elevated portions of the terrain over which the shredder/plow combination travels so as to deflect the shredder assembly housing 12 upward and over such obstructions without damaging the rotating cutting blades or impeding the forward travel of the shredder assembly.

The action of the flexible flap 106 and the counterclockwise rotation of the cutting blades 68 causes the air/trash mixture entering the shredder assembly housing 12 from the front to be deflected up and over the rotating blade retaining flange 66 and downwrd so as to exit the shredder assembly housing from the lower, rear portion thereof. The path taken by the air/trash mixture and the agitating action of the flexible flap 106 and rotating cutting blades 68 increases the cutting action of these blades in further reducing trash encountered by the shredder assembly.

Variably mounted to a lower, rear portion of each side panel 46 by means of a support arm 54 is a gauge wheel 52. The gauge wheel 52 is rotationally coupled to a distal portion of the support arm 54 by means of a mounting pin, or axle, 57. With support arm 54 mounted to the side panel 46 in a hinged manner by means of a mounting pin 60, the gauge wheel 52 may be variably positioned in a generally vertical manner by inserting a positioning pin 61 through matching apertures 58 in support arm 54 and side panel 46. This plurality of matching positioning apertures 58 provides for the variable vertical positioning of the gauge wheel 52 permitting the running height of the shredder assembly 12 to be precisely adjusted as desired. For the sake of completeness, the left gauge wheel mounted to the shredder assembly housing 12 is shown as element 52A in FIG. 1.

As previously described, the toolbar assembly 14 is coupled to the aft portion of the rear support element 38 of the arched bridge structure by means of connecting pins 44 coupling respective coupling plates 40, 42 thereof. The toolbar assembly 14 includes a plurality of lower frame members 128 aligned along the direction of movement of the toolbar assembly 14. In a preferred embodiment, the toolbar assembly 14 includes four lower frame members. Oriented perpendicular to the lower frame members 128 and securely coupled thereto are front and rear toolbars 124, 126 upon which may be mounted in a conventional manner various agricultural implements as dictated by the task being performed and operating conditions. Positioned immediately above the plane defined by lower frame members 128 and front and rear toolbars 124, 126 are a pair of upper frame members 130 which are mounted upon and supported by front and rear support elements 133, 131. Front and rear support elements 133, 131 are respectively mounted in a conventional manner to adjacent, front and rear toolbars 124, 126. Mounted to the forward portion of each combination of an upper frame member 130 and support element 133 is a mounting bracket 134 to which is rotationally coupled an hydraulic cylinder 138 by means of a connecting pin 146. Extending below and integrally coupled to the front toolbar 124 is a lower mounting bracket 132. Lower mounting bracket 132 includes an aperture therein in which is inserted a connecting pin 146 for rotationally coupling a lift arm 136 thereto. The distal portion of lift arm 136 is provided with an aperture therein through which is inserted a mounting pin, or axle, 160 for the rotational coupling of a transport wheel 158 thereto. To the distal portion of the lift arm 136 is also securely mounted a coupling bracket 142 to which is rotationally coupled the cylinder rod 140 of the hydraulic cylinder 138. For the sake of completeness, the left lift arm and left hydraulic cylinder are shown in FIG. 1 as elements 136A and 138A, respectively.

Each hydraulic cylinder 138 is coupled by means of hydraulic lines 126 to the tractor's hydraulic system. The connection between the hydraulic lines 26 and the hydraulic cylinders 138 is contemplated as being conventional in nature, does not form a part of the present invention and for simplicity sake is not shown in detail in the figures. From the figures, it can be seen that the extension and retraction of the cylinder arm 140 in and out of hydraulic cylinder 138 in response to changes in hydraulic pressure will result in the rotational displacement of a transport wheel 158 about the axis defined by connecting pin 146 positioned in the proximal, upper portion of lift arm 136. Thus, the lift arm/transport wheel combination may be displaced in a raised position shown in dotted line form in FIG. 2 for the operating mode of the shredder/plow combination 10. With the transport wheel 158 displaced downward in the lowered position, the shredder/plow combination may be easily transported to and from a work area.

A bracket 71 which includes a slot 75 is fixed to the shredder assembly 12. A pair of frame members 73 is positioned beneath an adjacent frame support element 34. Each frame member 73 has a vertical row of holes. A roller 77 is positioned between frame members 73 and within slot 75. The roller position is fixed and adjusted by pin 79 inserted thru a choice of three holes. The shredder assembly is therefore free to move vertically as the rotor blades or ground contact shoes encounter irregular terrain. When the plow frame is lifted by the hydraulic cylinders in conjunction with the lift arms, the attached arch 10 moves upward causing the adjustable lifting chains 166 to lift the shredder assembly to the transport position.

There has been shown an integral shredder/plow combination which provides for the thorough shredding and cutting of surface trash and its mixing with the soil by trailing plow assemblies. An arched structure positioned above the shredder's rotor assembly couples a conventional tool bar assembly directly to a tractor hitch and avoids subjecting the shredder assembly to the high drag and torsion forces typically encountered during plowing operations. The rear tool bar assembly includes hydraulically actuated pistons coupled to transport wheels permitting the entire shredder/plow combination to be displaced upward for facilitating its transport to and from a work area.

While particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention. The matters set forth in the foregoing description and accompanying drawings are offered by way of illustration only and not as a limitation. The actual scope of the invention is intended to be defined in the following claims when viewed in their proper perspective based on the prior art.

I claim:
1. A shredder/plow combination adapted to be drawn by a tractor in an intended direction of travel, said tractor having a source of hydraulic power, a rear hitch and a rear power takeoff, said shredder/plow combination comprising:
a trailer hitch frame having a rear end and a front end adapted to be securely coupled to the rear hitch of said tractor;
a shredder assembly coupled to the rear end of said hitch frame and including:
   a housing wherein is mounted a rotor having an axis of rotation generally perpendicular to said intended direction of travel and a plurality of cutting blades mounted thereon; and
   an upwardly arched structural member coupled to and positioned generally above and supporting said housing and including an aft portion and a forward portion, with said structural member including an upwardly extending forward support element coupled to the rear end of said frame, an upwardly extending rear support element and a generally horizontally oriented center support element coupling said forward and rear support elements with said rear support element having a coupling means thereon;
power coupling means for connecting the rear power takeoff off said tractor to said rotor for angularly displacing said cutting blades;
a toolbar assembly including a plow unit mounted thereon, said toolbar assembly including a forward portion thereof coupled to said rear coupling means of said rear support element of said structural member, and transport wheels coupled to said assembly.

2. A shredder/plow combination in accordance with claim 1 wherein said power coupling means includes rotating shaft means for coupling said rear power takeoff to said rotor.

3. A shredder/plow combination in accordance with claim 2 wherein said rotating shaft means includes a plurality of rotating shafts coupled by means of a universal joint.

4. A shredder/plow combination in accordance with claim 3 wherein said universal joint is mounted on said frame.

5. A shredder/plow combination in accordance with claim 2 wherein said power coupling means further includes transmission means coupled to said rotating shaft means and to a sheave/drive belt combination coupled to said rotor for imparting angular displacement to said cutting blades.

6. A shredder/plow combination in accordance with claim 5 wherein said sheave/drive belt combination includes a first sheave coupled by means of a rotating bar to said transmission means, a second sheave coupled to said rotor and a drive belt coupling said first and second sheaves.

7. A shredder/plow combination in accordance with claim 6 further including variable tensioning means mounted to said shredder assembly and cooperatively coupled to said drive belt for varying the tension thereof for selectively adjusting the drive force applied to said rotor.

8. A shredder/plow combination in accordance with claim 7 wherein said variable tensioning means includes an idler pulley assembly engaging a portion of said drive belt for selectively varying the tension thereon.

9. A shredder/plow combination in accordance with claim 8 wherein said variable tensioning means further includes a rotationally displaceable mounting bracket and adjusting bolt combination and wherein said idler pulley assembly is rotationally coupled to said mounting bracket with said mounting bracket rotationally displaceable by means of said adjusting bolt.

10. A shredder/plow combination in accordance with claim 1 wherein said shredder housing includes having a plurality of panels defining an enclosure wherein is positioned said rotor, said housing being open at the bottom permitting said cutting blades to extend beneath said housing for engaging and shredding surface trash.

11. A shredder/plow combination in accordance with claim 10 wherein said housing includes a flexible flap mounted on a lower, front portion thereof and extending substantially the length of said housing for deflecting said surface trash upward and into said rotating cutting blades.

12. A shredder/plow combination in accordance with claim 1 wherein said shredder assembly further includes gauge wheels mounted on said housing for establishing the running height of the cutting blades.

13. A shredder/plow combination in accordance with claim 12 further including variable mounting means coupling said gauge wheels to said housing for selectively changing the position of said gauge wheels on said housing whereby the running height of said cutting blades may be varied as desired.

14. A shredder/plow combination in accordance with claim 13 wherein said shredder assembly housing includes a plurality of panels defining an enclosure open at a bottom portion thereof and wherein is located said rotor, said housing including first and second side panels on respective ends thereof with a gauge wheel rotationally mounted to each of said first and second side panels.

15. A shredder/plow combination in accordance with claim 1 further including hydraulically actuated displacement means coupled to said transport wheels and to the tractor's source of hydraulic power and responsive to changes in pressure therein for displacing said transport wheels in a generally vertical direction to a first, lowered transport position or a second, raised working position.

16. A shredder/plow combination in accordance with claim 15 wherein said hydraulically actuated displacement means includes a plurality of hydraulic cylinders each coupled to said toolbar assembly and to a respective one of said transport wheels for the selective displacement thereof between said first and second positions.

17. A shredder/plow combination in accordance with claim 1 wherein said toolbar assembly includes front and rear toolbars to which are mounted a plurality of chisel plow assemblies.

18. A shredder/plow combination in accordance with claim 1 wherein said toolbar assembly includes front and rear toolbars on which are respectively mounted a plurality of cutting coulters and a plurality of chisel plow assemblies.

19. A shredder/plow combination in accordance with claim 1 wherein said frame includes detachable connection means connecting said shredder assembly thereto.

* * * * *

UNITED STATES PATENT AND TRADEMARK OFFICE
CERTIFICATE OF CORRECTION

PATENT NO. : 4,522,267
DATED : June 11, 1985
INVENTOR(S) : Richard A. Lewison

It is certified that error appears in the above-identified patent and that said Letters Patent is hereby corrected as shown below:

Column 5, line 49 delete "shoe" insert--shoes--;

Column 8, line 4 delete "off" insert --of--.

Signed and Sealed this

Twenty-ninth Day of October 1985

[SEAL]

Attest:

DONALD J. QUIGG

Attesting Officer

Commissioner of Patents and
Trademarks—Designate